Nov. 16, 1954

F. LARSEN 2,694,803

ALARM MECHANISM FOR THE PROTECTION OF MOVABLE CONTAINERS

Filed Sept. 8, 1951

INVENTOR:
FRITZ LARSEN

BY
ATTORNEY

Nov. 16, 1954  F. LARSEN  2,694,803
ALARM MECHANISM FOR THE PROTECTION OF MOVABLE CONTAINERS
Filed Sept. 8, 1951  2 Sheets-Sheet 2
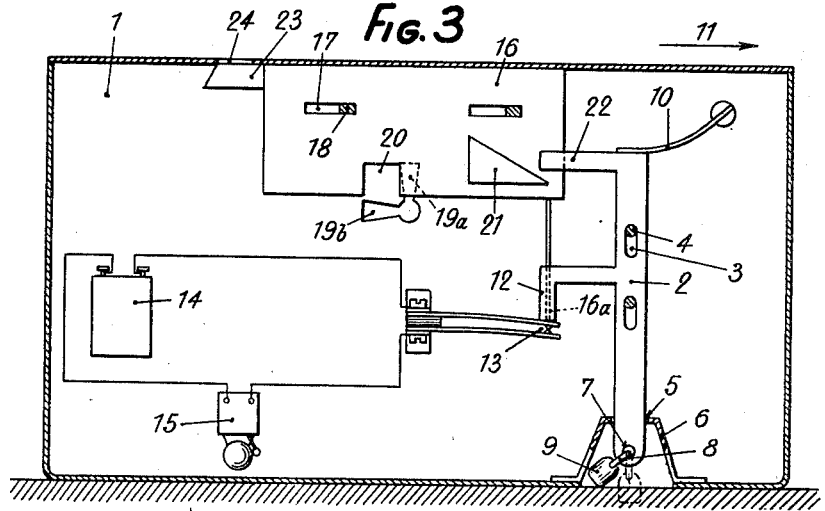
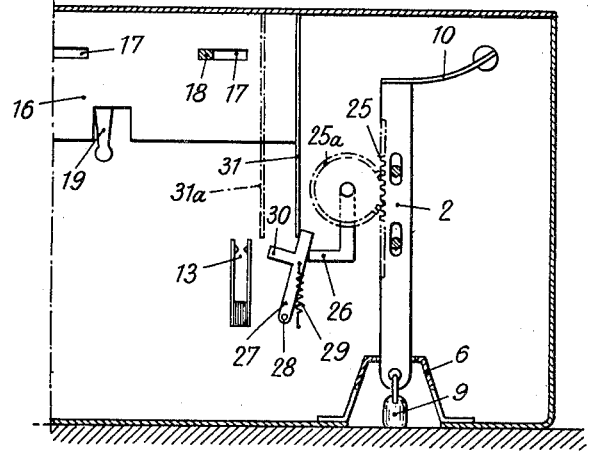
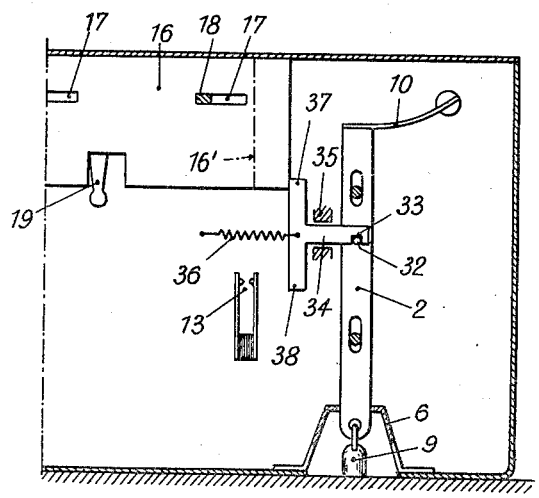

United States Patent Office 2,694,803
Patented Nov. 16, 1954

2,694,803

ALARM MECHANISM FOR THE PROTECTION OF MOVABLE CONTAINERS

Fritz Larsen, Paris, France

Application September 8, 1951, Serial No. 245,660

Claims priority, application France December 18, 1950

10 Claims. (Cl. 340—280)

My invention has for its object an alarm mechanism adapted to provide protection against burglars and the like by producing a persistent audible signal, as soon as the least tampering or shifting occurs. Said mechanism is contained in a box that may serve directly as a safe box or locker adapted to receive the objects to be protected or that may be simply located at any suitable point such as the door or window of the premises to be protected or over a stack of dockets, securities, bank notes or the like, in a manner such that any tentative removal even of a single article produces of necessity a shifting of the box that releases the alarm signal.

The alarm box, according to the invention, comprises in combination a preferably pivoted arrangement adapted to be deformed when the box is moved in any direction, in association with alarm means, preferably acoustic, control means adapted to produce a release of the alarm means as soon as the deformable arrangement has changed its shape as a consequence of a shifting of the box, and a movable locking member operated from the outside through a removable member and adapted to occupy two distinct stable positions and to prevent in one of said positions the release of the alarm means, while allowing in the other position the release of said alarm means as a consequence of a deformation of the deformable system produced by a shifting of the box, this member furthermore preventing the stopping of the alarm once it has been released as long as it remains in said other position.

According to a further feature of the invention, the control means are coupled with the alarm only when they are to release same.

According to a further feature of the invention, the control means may execute, as a consequence of a deformation of the deformable system, a movement the nature and/or direction and/or amplitude of which may differ from those of the member of the deformable system actuating them.

A further object of the invention consists in using as a movable locking member the bolt of a lock in which case the removable control member is constituted by a key.

Further features and advantages of my invention will appear in the reading of the following description, reference being made to accompanying drawings wherein:

Fig. 3 is a similar view of the members after the alarm has been released.

Fig. 5 is a view similar to that of Fig. 1 showing the details of a modification.

Fig. 6 is a similar view of the details of a further modification.

Figure 1:
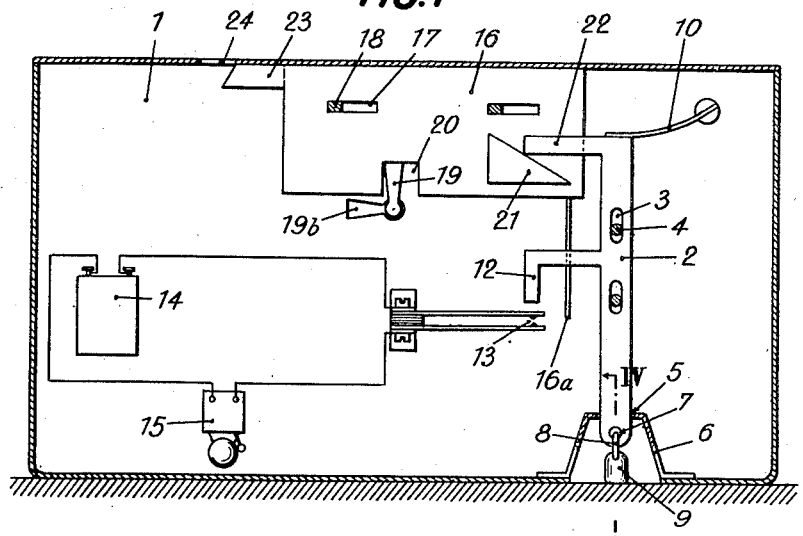
Fig. 1 illustrates diagrammatically an alarm box according to the invention, the members being shown as locked in their inoperative position.

In the embodiment illustrated in Figs. 1 to 4, 1 designates a box or chest of steel or like suitable material. Inside this box is arranged a vertical bar 2 provided with elongated openings 3 engaged by pins 4 secured to the side wall of the box 1.

The lower end of the bar 2 passes through an opening 5 provided in a recess 6 in the bottom wall of the box 1. This lower end of the bar 2 is also perforated at 7 to carry a ring 8 secured to a small weight 9 adapted to lie in contact with the carrier on which the box 1 rests. It should be noticed that the system 7, 8 forms a universal joint allowing the small weight 9 to be shifted with reference to the bar 2 in all directions, said weight and bar forming the deformable arrangement referred to hereinabove.

The bar is urged downwardly by a spring blade 10. This downward movement of the rod 2 causes a bent arm 12 that is rigid with the bar 2 to engage two contact blades 13 and to close a circuit through the latter. Said contact blades are effectively inserted in a circuit comprising in addition thereto a battery 14 and a bell 15, both housed inside the box 1. Consequently the closing of the contacts 13 operates the bell 15.

The box 1 also contains a movable locking member 16 having elongated openings 17 guiding its sliding movement over carriers 18 passing through said elongated openings and that are rigid with the sidewall of the box 1. The shifting of said movable member 16 may be controlled from the outside through the agency of a key 19 engaging simultaneously a corresponding keyhole 19a in the box and a notch 20 provided in the locking member 16.

The member 16 includes a depending elastic extension 16a adapted to cooperate with the contact blades 13 in the manner disclosed hereinafter and it carries also a wedge-shaped cam member 21 adapted to cooperate with a transverse arm 22 on the bar 2. At its front end the locking member 16 may include an extension 23 forming a bolt and adapted to engage a strap that is not illustrated and that may be rigid with a cover adapted to be folded over the box 1 and pass through the opening 24 in the latter when the cover is closed.

The above described arrangement operates as follows: in the position illustrated in Fig. 1, the movable locking member 16 is in its inoperative position. For this position the cam member 21 prevents through engagement with the arm 22 any downward movement of the detecting bar 2 and thereby the release of the bell 15.

Figure 2:
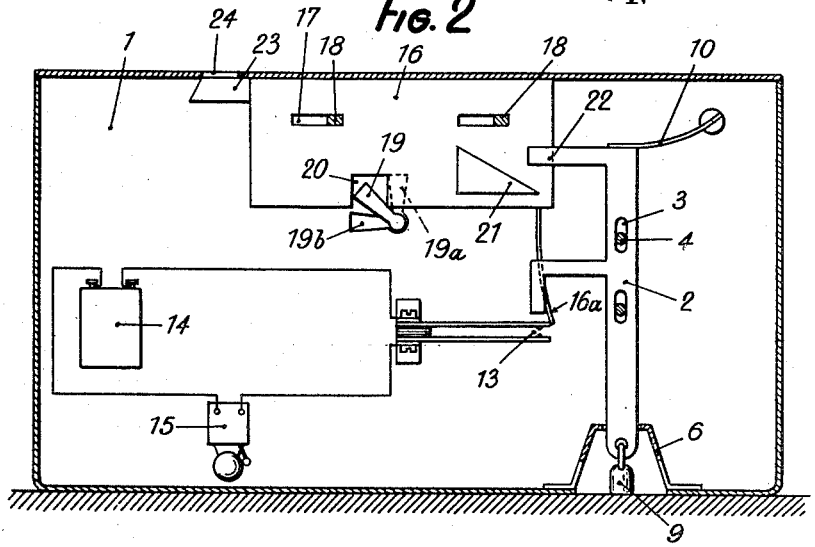
Fig. 2 is a view similar to that illustrated in Fig. 1 showing the box in its cocked position ready for operation.
Figure 4:
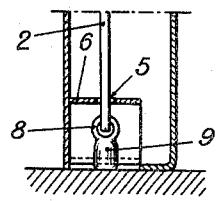
Fig. 4 is a detail sectional view on line IV—IV of Fig. 1.

Through introduction of the key 19 into the keyhole 19a and through a rocking movement of the key in the required direction, it is possible to bring the movable member 16 into the position illustrated in Fig. 2 and forming the cocked position. In the position thus assumed, the key may be removed through the opening 19b. On the other hand, the cam 21 has now released the arm 22 so that the bar 2 may sink under the action of the spring 10. In the cocked position illustrated in Fig. 2, this downward movement is, however, still prevented by the small weight 9 resting on the same carrier as the box 1 and holding the bar 2 in its upper position. Furthermore, the elastic extension 16a on the movable member 16 engages, by reason of the shifting of the latter, the end of the upper contact blade 13 while bending to a slight extent.

When the box 1 thus cocked is shifted, for instance in the direction of the arrow 11 (Fig. 3), the small weight 9 rocks, which allows the bar 2 to sink into the position illustrated in Fig. 3 for which the arm 12 brings the two blades 13 into contact with one another so as to close the circuit feeding the bell 15. On the other hand, the lowering of the upper contact blade has allowed the elastic extension 16a to reassume its rectilinear shape so that its lower end engages the upper surface of the said upper blade and definitely prevents the latter from rising. Consequently, the contact blades 13 are locked in their circuit-closing position, whereby even the subsequent rising movement of the bar 2 cannot break the circuit feeding the bell 15. It is, therefore, to be remarked that once the alarm signal is released, it cannot any longer be stopped through a mere returning of the bar 2 into its original position.

To stop the alarm, it is necessary to engage the key 19 inside the opening 19b and to return the movable member 16 into the position illustrated in Fig. 1. Through this movement, the bar 2 is raised by the cam member 21 on the locking member 16 and the extension 16a is raised above the contact blades 13 that return into their inoperative circuit-opening position illustrated in Fig. 1, by reason of their elasticity.

The above described arrangement provides an efficient protection against any attempted theft or burglary.

It may form itself a locker in which the articles to be protected may be placed. But it is also possible to use said arrangement for the protection of premises by laying the cocked box containing the alarm mechanism against a door or a window of the premises to be protected. In all cases, the slightest shifting of the box 1 or the raising of the latter will produce a sinking movement of the bar 2 and thereby a release of the bell which can be stopped only by using the key 19 that returns the arrangement into its inoperative position.

In the modification illustrated in Fig. 5, the bar 2 is provided with rack teeth 25 meshing with a toothed wheel 25a rotating in unison with the bent arm 26. Said arm 26 may engage, in a given angular position of the wheel 25a, a rocking lever 27 that is pivotally secured to a suitable support, shown 28, and that is urged by a spring 29 either against the end of the arm 26 or against the contact blades 13 according to the angular position given to the lever 27 to either side of a neutral position. Said lever 27 is rigid with a lateral projection 30 adapted to provide for engagement with the contact blades 13 when the lever 27 pivots round the pivot 28 into the corresponding angular position.

The movable locking member 16 carries at its rear end a downwardly projecting rod 31 the position of which, as illustrated in Fig. 5, corresponds to an inoperative position of the mechanism, said rod 31 assuming the position illustrated in dotted lines 31a, i. e. its cocked position, upon shifting of the member 16 to the left.

This mechanism operates as follows: The arrangement is cocked as precedingly after positioning the box in the desired location by bringing the locking member in a position in which the locking rod 31 occupies the position 31a.

When the bar 2 sinks, as a consequence of a rising movement of the box or through a rocking of the small weight 9 due to a lateral shifting of the box, the wheel 25a is driven into rotation. This rotary movement produces through the agency of the arm 26 a rocking of the control lever 27. When the latter has moved past a predetermined critical or neutral position. the spring 29 urges the arm 30 carried by it against the contact blades 13 so as to release the alarm signal. It should be noticed that the operated position of the control lever or toggle mechanism 27 is a stable position, whereby the return of the bar 2 into its upper starting position produces no opening of the contact blades 13 even if the arm 26 has returned into its starting position. The alarm signal can be stopped only by returning the movable locking member 16 back into the position illustrated in Fig. 5, as by the operation of the key 19. During this return movement, the projecting arm 31 returns the control lever 27 into contact with the bent arm 26, which allows the contact blades 13 to return into their inoperative circuit-breaking position.

This last-described embodiment shows in particular the advantage of establishing a predetermined relationship between the movement of the detecting bar 2 and that of the members acting on the contact pieces 13, which allows obtaining a release of the alarm signal even for very small movements of the rod 2.

In the modification illustrated in Fig. 6, the tampering detection bar 2 carries a pin 32 engaging a notch 33 in a movable T-shaped control member 34 suitably guided at 35. The vertical cross bar 37 on the member 34 abuts against the rear end of the locking member 16 when the latter is in its inoperative position illustrated in solid lines.

A spring 36 acts on the control member 34 so as to urge the free end 38 of its cross-bar against the contact blades 13 as soon as said control member is released.

The above disclosed arrangement operates as follows: When it is desired to cock the arrangement, the bar 2 is first brought into its upper position illustrated in Fig. 6, the box containing the mechanism being laid upright on its carrier, and then the key 19 is operated in order to shift the locking member 16 and to bring its rear end into the position 16'.

When the box is raised or when the small weight 9 is rocked, the spring 10 produces a downwardly directed movement of the detecting bar 2. This movement releases the pin 32 with reference to the notch 33 which allows the spring 36 to return the control member 34 leftwards whereby its cross-bar closes the contact blades 13 and releases the alarm. In this case again the alarm signal cannot be stopped by a rising movement of the bar 2 as such a movement has no action on the position assumed by the member 34. For stopping the alarm signal, it is necessary to return the locking member 16 through the agency of the key 19 into the position illustrated in Fig. 6. During this movement, the rear end of the member 16 urges the control member 34 back into its inoperative position through a positive action on the cross-bar 37.

Obviously, the above described embodiments as illustrated in the accompanying drawings have been disclosed by way of a mere exemplification and it is possible to modify in any suitable manner the shape, the nature, the arrangement and the mounting of the different parts without unduly exceeding thereby the scope of the invention as defined in accompanying claims. Thus, the deformable detecting means may assume any desired configuration.

On the other hand, the connection between said deformable system provided for detecting any tampering action and the actual alarm means may include any suitably shaped control members executing movements, the nature and/or direction and/or amplitude of which may differ from those of the part of the deformable system controlling them. Thus, the control members may execute a translational, rotary or pivotal movement the ratio of the amplitude of which, with reference to that of the movement of the deformable detecting system, may be selected as desired. The power unit supplied for the alarm mechanism is not of necessity an electric battery and may as well be constituted by a clockwork the releasing lever of which replaces in such a case the contact blades 13. Said clockwork may then be wound up through the key intended for the control or cocking of the mechanism or else through a separate key. The locking member 16 may form the bolt of a safety lock or else be rigid with the latter, which still increases the reliability of the protection afforded by the mechanism against tampering by any unauthorized person.

What I claim is:

1. An alarm mechanism comprising a box provided with an opening; a control element substantially fully enclosed by said box and inaccessible from without; mounting means in said box supporting said control element for movement between a normal and an off-normal position thereon; removable key means fitting said opening and adapted to displace said control element from without; alarm means inside said box; operating means within said box for rendering said alarm means effective, said operating means including a first member, a second member pivotally joined to said first member and normally so balanced in alignment therewith as to maintain said first member in an inoperative position, said second member being free to move out of alignment with said first member, thereby releasing the latter from said inoperative position, upon becoming unbalanced in response to movement of said box, resilient means urging said first member into an operative position, and link means operatively connected with said first member for actuation of said alarm means upon movement of said first member into said operative position; blocking means on said control element interfering, in said normal position of said control member, with any displacement of said link means tending to actuate said alarm means, thereby preventing operation of said alarm means in said normal position of said control element while permitting such operation in said off-normal position thereof; and resilient locking means in said box so engaging said alarm means, in said off-normal position of said control element, as to maintain said alarm means actuated independently of said locking member until said control element is returned to said normal position.

2. An alarm mechanism according to claim 1 wherein said first member comprises an elongated bolt provided with guide means positively engaging said bolt at two spaced points for longitudinal movement only.

3. An alarm mechanism according to claim 1 wherein said first member is provided with an extension engageable by said blocking means in said normal position of said control element for substantial immobilization of said first member.

4. An alarm mechanism according to claim 1 wherein said alarm means comprises a contact element and said locking means comprises a spring element carried by said control element and adapted to engage said contact element only in said off-normal position of said control element.

5. An alarm mechanism according to claim 1 wherein said locking means comprises spring means connected with said link means, said link means having a first position of operative engagement with said first member and being adapted to be moved by said spring means into a second position of effective disengagement from said first member upon movement of said first member into said operative position, said link means actuating said alarm means in said second position.

6. An alarm mechanism according to claim 3 wherein said blocking means comprises cam means positioned for co-operation with said extension to restore said first member from operative to inoperative position upon return of said control element to said normal position.

7. An alarm mechanism according to claim 5 wherein said link means comprises a toggle lever adapted to be held by said spring means in either of two stable positions representing said first and said second position, said first member being provided with pusher means adapted to move said toggle lever from said first into said second position upon movement of said first member to said operative position.

8. An alarm mechanism according to claim 5 wherein said link means comprises an actuating element tensioned by said spring means for movement away from said first member and provided with detent means maintaining said actuating element engaged by said first member as long as the latter is in said inoperative position.

9. An alarm mechanism according to claim 5 wherein said blocking means is positioned in the path of said link means for interfering with movement of said link means into said second position in said normal position of said control element.

10. An alarm mechanism according to claim 7 wherein said first member is provided with rack teeth, said pusher means comprising a toothed wheel engaged by said rack teeth and provided with an arm adapted to strike said toggle lever upon rotation of said wheel.

References Cited in the file of this patent

UNITED STATES PATENTS

| Number | Name | Date |
| --- | --- | --- |
| 548,887 | Murphy | Oct. 29, 1893 |
| 786,843 | Robinson, et al. | Apr. 11, 1905 |
| 919,385 | Rathven | Apr. 27, 1905 |
| 1,409,156 | Dillon | Mar. 14, 1922 |
| 2,053,901 | Findlay | Sept. 8, 1936 |
| 2,273,440 | Gould | Feb. 17, 1942 |